United States Patent Office 3,185,559
Patented May 25, 1965

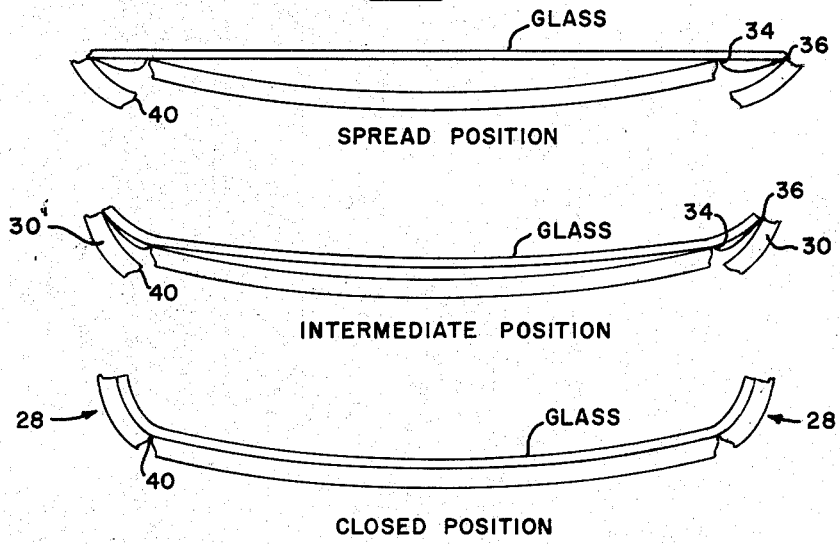
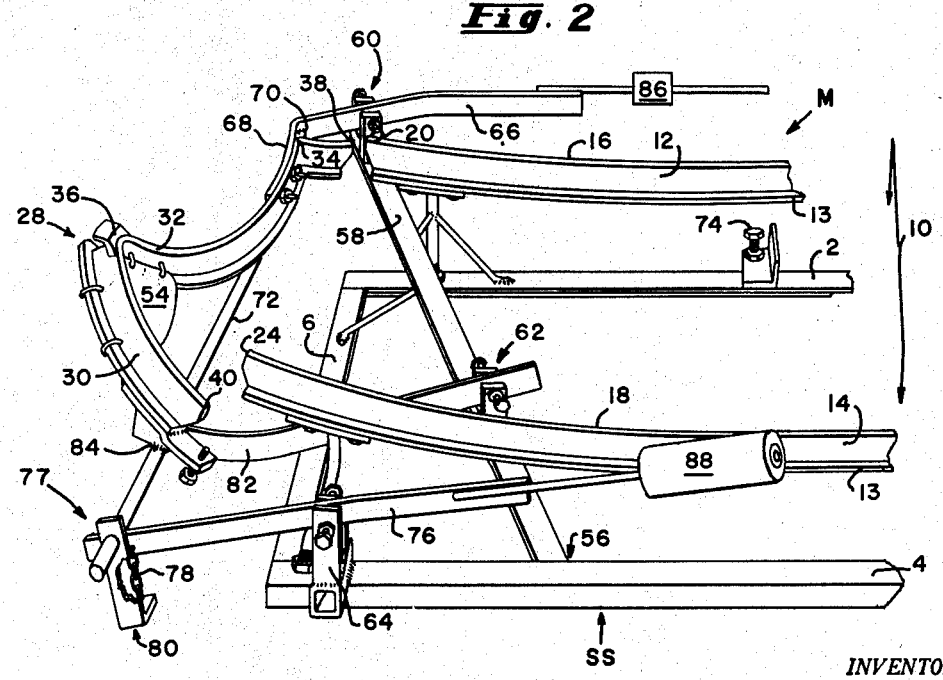

3,185,559
BENDING MOLD
James H. Elliott, Lawrence H. Stauffer, and John G. Garbin, Greensburg, Pa., assignors to Pittsburgh Plate Glass Company, Pittsburgh, Pa., a corporation of Pennsylvania
Filed Aug. 29, 1961, Ser. No. 134,671
11 Claims. (Cl. 65—291)

This application relates to an improved bending mold and in particular, to an improved sectionalized bending mold comprising a plurality of molding members and having canted hinge support for the endmost mold members.

With the advent of windshields of increasingly complex shapes, more sophisticated bending techniques have been developed. These techniques involve the use of sectionalized molds of skeleton configuration conforming in elevation and outline to the shape of the curved glass sheet.

The most effective molds of this type are concave in elevation and include a rigid, central molding member comprising spaced, stainless steel shaping rails of concave elevation extending lengthwise of the mold, flanked by pivotable end mold members. Each of the latter comprises a concavely curved, stainless steel rail extending longitudinally outwardly from adjacent a longitudinal extremity of one of said central molding member shaping rails around a longitudinal extremity of the mold and then longitudinally inwardly thereof toward the longitudinal extremity of the other shaping rail comprising the central molding member. In the above described mold, the end mold members rotate into a spread mold position to support a flat glass sheet as a beam adjacent its longitudinal extremities. In many mold constructions, the longitudinal extremities of the central mold member also offers support to the flat glass sheet. The end mold members are preferably counterweighted to urge their upward rotation. Weighted lever arms are attached to the end mold members to accomplish the latter result.

In accordance with modern production practice, such glass laden molds are successively conveyed laterally through a tunnel-like bending lehr. In the lehr, the molds are first conveyed through a preheat zone where they are exposed to successive regions of increasing temperatures until they reach a temperature below the glass softening point. The molds are then conveyed through a glass bending zone heated to an elevated temperature pattern having spaced regions of relatively high temperatures. This latter temperature configuration is necessary because portions of the glass sheet to be bent most sharply are conveyed through the spaced regions of relatively intense heat.

When glass laden molds are subjected to glass softening temperatures, the central portion of the glass sheet sags to conform to the upper shaping surface of the center mold member rails, while the end mold members rotate upwardly into a closed mold position, wherein their longitudinally inner extremities are adjacent to the longitudinal extremities of the center molding member rails, so that the end mold members and the rails of the center mold member form a substantially continuous outline shaping surface conforming in elevation and contour to the shape desired for the bent glass. The end mold members, by rotating upwardly into the closed mold position, lift the heat softened glass sheet extremities from their flat to a curved configuration and impress their upper shaping surfaces onto the heat softened glass sheet.

The present demand of the automobile industry is for a windshield shape that is relatively wide in the transverse direction and which has short and stubby portions at its longitudinal extremities bent relative to the remainder of the windshields. These wide glass shaping patterns having stubby ends present quite a problem to the windshield fabricators.

Former mold configurations support the glass sheet extremities at only one point along each end section of the mold. All the lifting force of the end mold member was thus transmitted to the glass sheet extremities at one point only. This technique worked fairly well so long as the glass sheets were shaped symmetrically about their longitudinal axis, were relatively narrow, and were bent into curvatures about axes extending substantially normal to their longitudinal axis.

The new glass patterns with relatively wide dimensions are not readily susceptible to fabrication by such point support molds. Each point support has to support and lift a very large area of glass, due to the breadth of the pattern. As the glass sheet softens, it naturally tends to sag between all existing points of support. This sagging is opposed to the lifting force on the glass sheet extremity at the point supports. These opposing forces produce optically unsightly kinking in that portion of the glass above the point supports.

Tip curl, reverse sag, and reverse marginal sag are additional drawbacks to the point support type of mold. Tip curl occurs when a large pressure is exerted on the tip of the glass during the lifting operation. This pressure causes the tip of the glass to continue to bend inwardly of the mold after the mold has reached its closed position, permitting the glass tip to fall away from the tip of the mold shaping surface and toward the longitudinally inner portion of the mold.

Reverse sag or anticlastic curvature occurs when a glass sheet is bent along its longitudinal dimension. This bending subjects the glass to a stress parallel to its length. The glass sheet will compensate for the longitudinal distortion to some extent by developing a lateral contraction. This lateral contraction is a function of such parameters as the radius of curvature of the bend, the thickness of the glass sheet, and the width of the glass sheet which is being bent. The compensating transverse stress imposed in the glass distorts the glass sheet transversely of its longitudinal direction in such a manner that the bent sheet tends to warp in its transverse dimension in a direction opposite that imposed longitudinally. This factor imparts a caved-in appearance across its transverse dimension.

Reverse marginal sag occurs along the edges of the glass sheet that necessarily extend beyond the outline defined by the skeletonized mold. The portions of the glass sheet extending beyond the outline shaping surface tend to sag downwardly about their margin. This downward marginal sag is a funcition of the weight of the glass itself and the localized pressures exerted on the underside of the glass sheet by the supporting and lifting areas of the mold.

It has been found that if the area of the glass acted on by the end mold members is increased, the pressure exerted on the tip of the glass is reduced, thereby overcoming the above problems.

In order to increase the area of the glass acted on, a plurality of points along the curved shaping surface of the wing members must lie in the same plane and jointly support the flat glass sheet when the mold is in its spread position. These points must be spaced as great a lateral distance from one another as is possible. These points must also remain in a common plane of support as the softened glass sheet is lifted into its final bent shape. In addition, these points must be so situated on the shaping surface of the end member molding rail that the area of support on the rails will rapidly increase as the glass first begins to sag due to heating.

At first glance, an apparent solution to this problem is to bend a rectangular sheet of glass and then cut the glass to its desired shape after bending. The mold, to accomplish this bend, distributes the bending force over larger areas of the glass and there are no localized pressures on the viewing areas of the glass. However, bending in this fashion is extremely inferior to the method of bending wherein the glass is precut and a skeletonized bending mold used to bend the glass to its desired shape. The former operation is more expensive, requires several handling operations, each of which is a potential cause of glass fracture and the compressive stress pattern in the edges of the bent glass sheet is less than that is imparted to the edges by the latter method. The compressive stress pattern makes the glass much stronger as it is well-known that a body is much stronger in compression than in tension.

The above objectives have been accomplished by pivoting the end mold member about an axis extending at an oblique angle with respect to both a horizontal plane and a vertical plane. By canting the axis of pivot in an orientation which permits transversely spaced locations at the outer portion of the end mold member to occupy a common horizontal plane when the end mold member is pivoted outward and downward into its spread or flat glass supporting position, the areas of the glass acted upon by the upward movement of the end mold member toward the closed mold position is increased, reducing localized pressures, and eliminating the hereinbefore mentioned disadvantages of kinking, tip curl, reverse sag, and reverse marginal sag. This canting of the pivotal axis in both a horizontal and a vertical plane will be referred to hereinafter as a "double-canted hinge" design.

The double-canted hinge did, however, introduce problems of its own. In a mold of the type described, the weighted lever arms and the end mold members attached thereto were pivoted about the same axis. It has been customary to locate a pair of pivot points just laterally outward of each laterally opposed end of the center member rails and to pivot an end mold member about these two pivot points. The weighted lever arms were rigidly attached to each end mold member in such a manner that a lever arm and one end of the end mold member are pivotable about each pivot point.

If this procedure were followed to its natural conclusion in the double-canted hinge design, one of the pivot points would necessarily be located much closer to the longitudinal center of the mold than a laterally opposite pivot point, since the oblique axis extends inwardly of the mold. If this were the case, mechanical coupling of the end mold section to the weighed lever arm on the side of the mold containing the longitudinally inner pivot point would be very unstable, since the longitudinally outer portion of its lever arm connecting this side of the end mold member to the pivot point would necessarily run a considerably longer distance than is the case with prior art molds. Also, a larger force is required to rotate the end mold section and its elongated outer lever arm portion into the mold's closed position about a longitudinally inner pivot point than about a pivot point located closer to the mold extremity. To obtain the large force required, it is necessary to employ larger weights and/or longer lever arms than previously employed. However, if lever arms of normal length are employed with a pivot point located closer to the mold center than in prior art molds, the arms would extend over the center line and tend to engage one another at the longitudinal center and jam one another as the mold members approached their closed position. Since this problem arises using normal length lever arms, it is obvious that the same problem would exist to even a greater degree if longer lever arms were employed.

Long lever arms would introduce additional problems. In the first place, conventional bending lehrs have a very low ceiling clearance. Long lever arms, therefore, engage this ceiling when the mold is in its spread position. Secondly, long lever arms present a problem in loading the flat glass sheet onto the mold. Constantly lifting the glass sheet around or up and over the extended long lever arms is quite cumbersome and increases the possibility of loss due to chipping and/or breakage.

It is possible to employ a shorter than normal lever arm to avoid this engagement. This requires using a greater mass of weight material. This practice also has its drawbacks. A great mass of metal located near the glass, as these necessarily would be, acts as a heat extractor and establishes a sharp thermal gradient or differential in the area of the glass adjacent thereto with respect to the surrounding area of glass. This temperature gradient creates an area of great optical distortion and stress pattern highly undesirable in automobile glazing closures.

In addition to the weight mass being too close to the glass sheet, the metal mass of the hinge support is necessarily closer to the glass by virtue of its vertical displacement and will result in the same stresses and distortions that are caused by the metal weighting mass.

Of course, these stresses could be removed from the glass but this would involve the additional time and expense of subjecting the glass to an additional heating and annealing treatment to modify the undesired stress pattern.

In accordance with a specific embodiment of the present invention, a pivot point is located on the pivotal axis and adjacent an end of one of the center mold member rails. A weighted lever arm rigidly attached to one side of an end mold member is in pivotal engagement with said pivot point. The lever arm has an inner portion extending longitudinally inwardly and an outer portion extending longitudinally outwardly from the pivot point as in prior art sectionalized mold construction.

The axis of pivot extends downward and inward of the mold from this pivot point. Another pivot point is mounted on the pivotal axis but located in a horizontal plane far below the mold shaping surface and within an area parallel to that enclosed by the periphery of the mold shaping surface. This pivot and the glass are maintained a great distance from one another so as not to introduce distortion or stresses due to the hinge's mass. The other side of the end mold member is in pivotal contact with this other pivot point. The end mold member is rotatable about said pivotal axis. A third pivot point is provided, completely disassociated from said axis, and situated laterally outboard of, but adjacent to, the laterally opposite end of the other center mold member rail. The other weighted lever arm is pivotally attached to this third pivot point for rotation thereabout in a vertical plane. A flexible coupling system connects this lever arm to the end mold section and transmits the lifting force developed by this weighted lever arm to the end mold section. This arrangement permits the use of a double-canted hinge to provide an oblique axis for pivoting an endmost mold section with respect to another mold section in a bending mold while, at the same time, providing a sturdy mold, and without introducing any distortions due to irregular stresses imparted to the glass sheet to be bent.

With the proper orientation of the pivotal axis, the molding members support a flat glass sheet not solely at support points afforded by the end mold members. Intermediate support points are furnished by the outer extremities of the center mold member rails. As a result, the glass sheet is supported by at least eight points of support at all times. Each longitudinally outer portion of the glass sheet rests upon at least four points of support.

The end molding members are so situated that the support points contributed by the extremities of the center molding member rails and those contributed by the shaping surface of the end mold members form nearly a rectangular pattern of support. Supporting the glass in this manner has its obvious advantages. By locating the supports along the end mold member and spaced laterally from one another as far as possible, the ultimate is reached in distributing the lifting force of these sections over the largest possible area of glass. The intermediate supports serve to minimize kinking, since kinking is directly related to the length of unsupported spans of glass. In addition, since these intermediate supports are located near the area of most severe curvature of the bent glass sheet, they also reduce the reverse sag that would occur across the transverse dimension of the glass in the absence of such intermediate support.

The present invention will be better understood after reading a description of the particular embodiment thereof which follows. In the drawings forming part of the description of the illustrative embodiment, wherein like reference numerals refer to identical structural elements throughout, FIGURE 1 is a front view of the mold shaping rails of a glass bending mold, having end mold members pivoted in accordance with this invention, showing the mold in its spread position, intermediate position, and closed position.

FIGURE 2 is a detail view of one half of the mold of the present invention.

Referring to the drawing, M designates a sectionalized bending mold according to the present invention. The mold superstructure SS comprises a pair of longitudinally extending side members 2 and 4 which are interconnected at their ends by transversely extending beams only one of which is shown, indicated 6. The molding members themselves comprise a center mold section, indicated generally as 10, and two end mold members both designated 28. The center molding section 10 comprises a pair of laterally spaced shaping rails 12 and 14. Rails 12 and 14 have upper edge surfaces 16 and 18, respectively, that conform to the shape desired for the central portion of the flat glass sheets, and longitudinal extremities, only two of which are shown at 20 and 24, respectively. The rails shown extend longitudinally of the mold with the width dimension of the rails oriented vertically. The rails 12 and 14 are reinforced by reinforcement strips 13 attached to the bottom surface thereof providing a construction having an inverted T cross section. However, it is obvious that any type of rail could be used, for example an upright T section, a C channel section, or the like.

The end molding members 28 each comprise a substantially C-shaped rail 30 having an upper edge surface 32 conforming in elevation and outline to the contour desired for a marginal extremity of the bent glass sheet. End member rails 30 are oriented substantially perpendicular across their width to the shaping surface desired for the local area of the glass. Areas 34 and 36 on the upper edge surface of rails 30 are transversely spaced locations or areas of glass support and will be elaborated on hereinafter. The inner extremities 38 and 40 of rails 30 are those portions of the rail 30 closest to rails 12 and 14, respectively, and, of course, are adjacent the center section rails extremities 20 and 24.

Heat absorbing members 54 are provided to minimize sag in the extremities of the bent glass sheet and thereby provide a flat surface therefor. However, this heat absorber does not in any way constitute a part of this invention.

Since the mold is completely symmetrical, only one end area thereof will be described in detail. It should be recognized, however, that the present invention could be practiced in a nonsymmetrical bending mold, for example, in a mold for bending rear quarterlight sections for station wagons wherein only one longitudinal extremity of the glass has a curvature imparted thereto.

The present invention need not necessarily be practiced in a mold having a rigid center molding member. The invention could also be exploited in a collapsible type mold of the type disclosed and claimed in U.S. Patent 2,736,140, issued February 28, 1956, to L. V. Black. However, this latter mold structure is not preferred because of the abnormal stress pattern that results from the application of the large compressive forces at the longitudinal extremities of the glass sheet.

Each end molding member 28 is urged to rotate about a pivotal axis defined by pivot hinges 60 and 62 supported by shaft 58. The latter extends at an angle oblique to both a horizontal plane and a vertical plane. Specifically, the shaft 58 extends from laterally outboard and just under edge 20 of rail 12, downwardly and inwardly of the mold, until it joins beam 4 of superstructure SS at area 56.

Mounted on the shaft 58 are two pivot hinges, 60 and 62. Hinge 60 is located on the shaft and just laterally outside of the mold shaping surface and adjacent extremity 20. Pivot hinge 62 is supported on the shaft 58, within an area parallel to that enclosed by the periphery of the mold shaping surface and in a plane well below the shaping surface of the mold.

An additional pivot hinge 64 is located longitudinally outward of shaft 58 in spaced relation to the axis defined by pivot hinges 60 and 62 and is in no way connected thereto. Hinge 64 is located on the outboard side of the mold shaping surface and adjacent extremity 24. The hinges shown in the drawings are commonly referred to as "double-pivot" hinges. However, any suitable hinge could be employed, for example, the knife edge hinge of the type described and claimed in application Serial No. 833,778 of Harold E. McKelvey, filed August 14, 1959, for Improved Glass Sheet Bending Apparatus, and the hinge structure per se does not constitute any part of this invention.

A curved lever arm 66 is placed in pivotal engagement with hinge 60. Arm 66 is bent at 68 to extend towards the extremity of end mold member 28. Arm 66 is welded to a rod 72 at point 70. A weight 86 is secured to the free longitudinally inner end of arm 66. Conventional stop members 74 are attached to the superstructure member 2 to stop the rotation of the end molding member 28 when the latter has rotated into the desired closed mold portion.

The rod 72 extends transversely of the mold beneath the end mold member 28 from its point 70 of attachment thereto at one end thereof to an L-shaped member 80 to which its other end is rigidly attached. An arcuate bar 82 is pivoted at its longitudinally inner end to the pivot hinge 62 and is attached to the rod 72 at the point 84 intermediate the ends of the rod 72.

A straight lever arm 76 is pivoted intermediate its ends to rotate in a vertical plane about hinge 64. A chain 78 is suspended from the longitudinally outer end portion of lever arm 76 to interconnect the latter with the horizontal flange of an L-shaped member 80. Lever arm 76 has a weight 88 at its free longitudinally inner end. Weight 88 provides an upward lifting force for pivoting the end mold member 28 upward through lever arm 76, chain 78, L-shaped member 80, and bar 72. Reference number 77 is applied to the flexible coupling means comprising bar 72, L-shaped member 80, and chain 78 that operatively connects the end mold member 28 to the lever arm 76. It should be obvious that a chain is not the only mechanical coupling device that would function properly in the mold of the present invention. For example, a hinged arm or a pair of hinged arms, a bell crank, or the like, would also serve the desired purpose. These and many other mechanical equivalents become obvious in the light of the present description. The chain 78 is preferred due to its simplicity, flexibility, and durability.

End molding member 28 is made pivotal about axis 60–62 disposed parallel to pivot support shaft 58 by its connections to pivotal hinges 60 and 62. End molding member 28 is connected to hinge 60 by lever arm 66. Member 28 is connected to hinge 62 through bar 82.

In operation, a flat glass sheet is supported on the center rail extremities, 20 and 24, and on support points along the shaping surface of the end mold members. At least two such points will exist on each end mold member and these have been designated 34 and 36.

As can be seen from the drawings, the action of the oblique axis is such as to lower end mold member portion 40 a much greater distance than portion 48 when the mold is in its spread position. The shaping surface 32 of rail 28 between points 34 and 36 is very near to the flat glass sheet when the mold is spread.

As the mold is subjected to glass softening temperatures, the glass that gaps each and every support point will tend to sag. A very small amount of sagging will cause the glass above the chord line between points 34 and 36 to engage the mold shaping surface, as is best shown in FIGURE 1. Since the glass is now in contact with much more of the mold shaping rail surface 32, the lifting force of wing member 28 becomes distributed over a much larger portion of the glass. Depending on the glass pattern to be bent, it is possible to obtain glass support on 60% of the shaping surface of the end mold members employing the teaching of this invention. This eliminates the kinking, tip curl, reverse sag, and reverse marginal sag as mentioned hereinbefore without introducing any disadvantages that would result from adoption of the much more obvious solutions mentioned hereinbefore.

In the above embodiment of the invention, the pivotally attached molding members 28 are made to rotate about an oblique axis 60–62 disposed parallel to the pivot support shaft 58. Weighted lever arms 66 and 76 urge the mold into its closed position. The pivot 64 about which arm 76 is pivoted in a vertical plane is displaced longitudinally outward from axis 60–62. The lever arm 76 does not contact bar 72, but is connected to the pivotal molding member 28 by flexible coupling means 77 which comprises rod 72, L-shaped member 80, and chain 78; and, as the mold is urged into its closed position by the weighted lever arms 66 and 76, there is relative movement, inherently, between the lever arm 76 and the molding member 28 and the rod 72.

While a typical embodiment of construction illustrating the present invention has been described, the invention provided by this construction is not necessarily limited to the specific structural elements of the illustrative embodiment, but are limited only by the claimed subject matter which follows.

What is claimed is:

1. In a sectionalized bending mold having at least a pair of mold sections with upper shaping surfaces formed thereon, one of which sections is pivotally attached to the other section for pivotal movement about an axis extending obliquely of said mold and which comprises means attached to said pivotally attached section to urge the latter from a spread position to a closed position, the improvement comprising pivot means located in spaced relation to said axis extending obliquely, said urging means being operatively connected to said pivot means for pivotal movement thereabout and coupling means including a chain connection interconnecting said urging means and said pivotally attached mold section.

2. In apparatus for bending glass comprising a sectionalized bending mold having an end mold member which is pivotally attached to the other mold member for pivotal movement about an axis extending obliquely of said mold, said mold members having upper surfaces formed thereon conforming to different portions of an outline shaping surface, and which mold comprises means attached to said end mold member to urge the latter from a spread position to a closed position wherein said mold members are adjacent one another and their upper surfaces form substantially continuations of one another, the improvement comprising pivot means mounted on said apparatus longitudinally outward of said axis extending obliquely, said urging means being operatively connected to said pivot means for pivotal movement thereabout, and coupling means for permitting relative movement between said urging means and said end mold section, said coupling means interconnecting said urging means and said end mold section.

3. In apparatus for bending glass comprising a sectionalized, concave bending mold having at least a pair of mold members with upper shaping surfaces formed thereon, one of which mold members is pivotally attached to another mold member for pivotal movement about an axis extending obliquely of said mold and weighted lever arms operatively connected to said one mold member to urge the latter to pivot from a spread position to a closed position, the improvement comprising pivot means attached to said apparatus and located in spaced relation to said axis, at least one of said lever arms in pivotal engagement with said pivot means, and coupling means including a chain connection interconnecting said one of said lever arms and said one mold member.

4. Apparatus for bending glass comprising a sectionalized bending mold having at least one end mold member, first, second and third pivot means, said first and second pivot means being located on an axis extending obliquely of said mold, said end mold member being pivotally attached to said first and second pivot means for relative rotation about said axis, said third pivot means being attached to said apparatus longitudinally outward of said axis, urging means pivotally attached to said third pivot means for relative pivotal movement thereabout, and coupling means for permitting relative movement between said urging means and said end mold member, said coupling means interconnecting said urging means and said end mold member and urging said end mold member to pivot about said axis in response to said urging means pivoting about said third pivot means.

5. Apparatus for bending glass comprising a sectionalized bending mold having an end mold member, first, second and third pivot means, first and second urging means, said first and second pivot means being located on an axis extending obliquely of said mold, said end mold member being pivotally attached to said first and second pivot means for rotation about said axis, said first urging means being also in pivotal engagement with said first pivot means and located on the opposite side of said axis from that occupied by said end mold member, rigid coupling means interconecting said first urging means and said end mold member, said second urging means being in pivotal engagement with said third pivot means and located on the opposite side of said axis from that occupied by said end mold member, said third pivot means being spaced from said axis, and coupling means for permitting relative movement between said second urging means and said end mold member, said coupling means interconnecting said second urging means and said end mold member, whereby said first and second urging means cooperate to urge the wing member from a spread position to a closed position.

6. Apparatus for bending glass comprising a sectionalized bending mold having at least one end mold member, first, second and third pivot means, first and second weighted lever arms, said first and second pivot means being located on an axis extending obliquely of said mold to both a horizontal and a vertical plane, said end mold member being attached to said first and second pivot means for pivotal movement about said oblique axis, said first weighted lever arm being connected to said end mold member and pivotally attached to said first pivot means and comprising a weight located on the opposite side of said oblique axis from that occupied by said end mold member, said third pivot means being attached to said apparatus in spaced relation to said oblique axis, said second lever arm being pivotally attached to said third pivot means, coupling means for permitting relative movement between said second lever arm and said end mold member, said coupling means interconnecting said second lever arm to said end mold member, said second lever arm compressing a weight located on the opposite side of said oblique axis from that occupied by said end mold member, whereby said first and second lever arms cooperate to urge the end mold member from a spread position to a closed position.

7. In a sectionalized bending mold of skeleton configuration conforming in elevation outline to the shape of the curved glass sheet and comprising a stationary central member and at least one end mold member, first, second and third pivot means, said first and second pivot means being located on an axis oblique to both a horizontal and a vertical plane, first and second weighted lever arms, said second pivot means located on said axis but within an area projected by the periphery of the mold shaping surface and below same, said end mold member being in pivotal engagement with said first and second pivot means for pivotal movement about said axis, said first weighted lever arm in pivotal contact with said first pivot means for rotation thereabout, means rigidly connecting said first lever arm to said end mold member, said third pivot means spaced from and independent of said axis, said second lever arm in pivotal engagement therewith for pivotal movement thereabout, coupling means for permitting relative movement between said second lever arm and said end mold member, said coupling means interconnecting said second lever arm and said end mold member, said first and second weighted lever arms serving to urge said end mold member from a spread position to a closed position, said members having upper shaping surfaces.

8. Apparatus for bending glass comprising a sectionalized bending mold having at least one end mold member, said end mold member being pivotally attached to another mold member for pivotal movement about an axis extending obliquely of said mold, said end mold member pivoting into a spread mold position relative to said oblique axis wherein at least two points along its outer extremity laterally spaced from one another occupy a common horizontal plane, means attached to said end mold member to urge the latter from a spread position to a closed position, pivot means located on said apparatus but in spaced relation to said axis extending obliquely, said urging means being operatively connected to said pivot means for pivotal movement thereabout and coupling means including a chain connection interconnecting said urging means and said end mold member.

9. Apparatus for bending glass comprising a sectionalized bending mold having a center molding member and two end mold members having upper shaping surfaces, said end mold members situated at the longitudinal extremities of said center mold member and pivotally attached thereto for pivotal movement about a pair of axes extending obliquely of said mold, said end mold members pivoting into a spread mold position relative to their respective oblique axis wherein at least two points along the outer extremity of each end mold member occupy a common horizontal plane with corresponding of the other end mold member, means attached to each end mold member to urge them from a spread position to a closed position, at least a pair of pivot means located on said apparatus but in spaced relation to each said axis extending obliquely, said urging means being operatively connected to said pivot means for pivotal movement thereabout and coupling means including a chain connection interconnecting each said urging means and corresponding end mold members.

10. The apparatus of claim 9 wherein said center mold member comprises a pair of laterally spaced, longitudinal shaping rails each having a pair of longitudinal extremities, said longitudinal extremities disposed in said common horizontal plane when the mold is in its spread position.

11. In a sectionalized mold for bending a glass sheet comprising mold members having upper shaping surfaces formed thereon and including one of said mold members pivoted about a pair of hinge means forming an oblique axis with respect to another of said mold members for movement between a spread position wherein said mold members are spaced from one another and a closed position wherein said mold members are aligned in end-to-end relation longitudinally of said mold, the improvement comprising additional hinge means located longitudinally outward of said oblique axis and a weighted lever arm extending longitudinally of the mold laterally outside said shaping surface pivoted to said additional hinge means intermediate its ends, said weighted lever arm having a weight attached thereto longitudinally inward of said additional hinge means, and coupling means for permitting relative movement between said weighted lever arm longitudinally outward of said additional hinge means and said one pivoted mold member, said coupling means connecting a portion of said weighted lever arm longitudinally outward of said additional hinge means to said one pivoted mold member.

References Cited by the Examiner
UNITED STATES PATENTS
2,953,871   9/60   Peck _____ 65—291
FOREIGN PATENTS
216,178   7/58   Australia.

DONALL H. SYLVESTER, *Primary Examiner.*